US012777005B2

(12) United States Patent
Esnault et al.

(10) Patent No.: US 12,777,005 B2
(45) Date of Patent: Oct. 27, 2026

(54) CHATBOT FOR AN INSTANT MESSAGING APPLICATION

(71) Applicant: Orange, Issy-les-Moulineaux (FR)

(72) Inventors: Régis Esnault, Chatillon Cedex (FR); Thierry Martinez, Chatillon Cedex (FR); Christian Gregoire, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/574,495

(22) PCT Filed: Jun. 27, 2022

(86) PCT No.: PCT/FR2022/051269
§ 371 (c)(1),
(2) Date: Dec. 27, 2023

(87) PCT Pub. No.: WO2023/275472
PCT Pub. Date: Jan. 5, 2023

(65) Prior Publication Data

US 2024/0267345 A1 Aug. 8, 2024

(30) Foreign Application Priority Data

Jun. 28, 2021 (FR) ....................................... 2106901

(51) Int. Cl.
*H04L 51/02* (2022.01)
*H04L 51/04* (2022.01)

(52) U.S. Cl.
CPC .............. *H04L 51/02* (2013.01); *H04L 51/04* (2013.01)

(58) Field of Classification Search
CPC .......... H04L 51/02; H04L 51/04; G06Q 10/06
See application file for complete search history.

(56) References Cited

U.S. PATENT DOCUMENTS 8,898,098 B1 * 11/2014 Luechtefeld ........... G06Q 10/10 705/7.19
11,627,006 B1 * 4/2023 Chew ...................... H04L 51/02 704/275

(Continued)

FOREIGN PATENT DOCUMENTS

WO WO 2020/242596 A1 12/2020

OTHER PUBLICATIONS

International Search Report for International Application No. PCT/FR2022/051269, dated Aug. 22, 2022.

(Continued)

*Primary Examiner* — Soe Hlaing
(74) *Attorney, Agent, or Firm* — Knobbe, Martens, Olson & Bear, LLP

(57) ABSTRACT

A method for processing data of an instant messaging application in which users participating in a discussion exchange messages via respective terminals. The method, implemented by a computerized chatbot, includes: analyzing the exchanged messages in order to identify a current discussion context, determining a relevance of the chatbot intervening in the discussion, on the basis of the current context and on the basis of predetermined rules, and on the basis of the determination, sending at least one message appropriate to the current context to at least one of the participants.

13 Claims, 3 Drawing Sheets

(56) References Cited

U.S. PATENT DOCUMENTS

| | | | | |
|---|---|---|---|---|
| 11,763,085 | B1 * | 9/2023 | Alikaniotis | G06N 3/049 704/9 |
| 2012/0030301 | A1 * | 2/2012 | Herold | H04L 51/04 709/206 |
| 2018/0308473 | A1 * | 10/2018 | Scholar | A63F 13/00 |
| 2021/0134062 | A1 * | 5/2021 | Joseph | H04N 7/157 |
| 2022/0303153 | A1 * | 9/2022 | Laird-Mcconnell | H04L 12/1831 |

OTHER PUBLICATIONS

French Search Report and Written Opinion for French Application No. FR2106901, dated Feb. 9, 2022.

* cited by examiner

CHATBOT FOR AN INSTANT MESSAGING APPLICATION

CROSS-REFERENCE TO RELATED APPLICATIONS

This application is filed under 35 U.S.C. § 371 as the U.S. National Phase of Application No. PCT/FR2022/051269 entitled "CHAT BOT FOR AN INSTANT MESSAGING APPLICATION" and filed Jun. 27, 2022, and which claims priority to FR 2106901 filed Jun. 28, 2021, each of which is incorporated by reference in its entirety.

BACKGROUND

Technical Field

This description relates to the field of instant messaging (or "chat").

Prior Art

The term "chat room" (or "discussion room") designates a virtual meeting place accessible from a site, that an Internet user can choose on the basis of a proposed subject or an interest of the moment in order to communicate with a certain number of participants via a keyboard type of interface (or by voice recognition).

The term "chatbot" designates a (computerized) agent configured to communicate with a user. The user is offered an interface through which the user can question the chatbot on a research subject of his or her choice. The research that the user wishes to initiate on this "human-machine" interface is then influenced by what is called the "Turing" test, in which the dialogue with the machine must give the illusion that a program is thinking in a meaningful dialogue, thus making the interaction with the machine natural.

The chatbot is therefore more intended for a dialogue between a computerized agent and a user, while the chat room is usually a dialogue between several human users via terminals available to these users (terminals such as smartphones, tablets, computers, or other).

Additionally, there are "metabots" that are capable of orchestrating multiple chatbots at once and redirecting a specific user request to a given chatbot or to some other chatbot, on the basis of that user's intent.

Chatbots thus offer real resources to individual users for learning information.

A limitation of existing chatbots, however, is that they only offer to enrich the knowledge of an individual user, according that person's own research.

SUMMARY

The present description improves the situation.

To this end, it proposes the implementation of a computerized agent, particularly a chatbot type of agent, configured to intervene in the context of a virtual discussion room, particularly a chat room.

For this purpose, the present description relates to a method for processing instant messaging data in which users participating in a discussion exchange messages via respective terminals, the method, implemented by a computerized chatbot, comprising:

analyzing the exchanged messages in order to identify a current discussion context, determining a relevance of the chatbot intervening in the discussion, on the basis of the current context and on the basis of predetermined rules, and on the basis of said determination, sending, to at least one of the participants, at least one message appropriate to the current context and to at least one of the participants.

Thus, this description proposes a chatbot capable of addressing several users of an instant messaging system and participating in a same discussion (or "chat room") and thus integrating itself into this chat room. It is thus possible to orchestrate solving a problem with contributions from several people and one or more chatbots, for example in a business meeting, or to lead and/or enrich an exchange between several users, each user thus learning information of interest to the community of participants.

The aforementioned predetermined rules for chatbot intervention must be adapted specifically for an application to a chat room. Indeed, one problem with existing chatbots is inherent in the fact that they are only programmed to interact with a single conversational partner. Consequently, implementation of such a chatbot within a chat room firstly poses the problem of untimely intervention of the chatbot in a discussion, for example.

In particular, the set of predetermined rules includes predefined rules, modifiable rules, or even new rules. Thus, in one embodiment, the aforementioned predefined rules may include at least the detection of a wake-up word for the chatbot in a latest message of the discussion.

In addition or as a variant, the predefined rules may include at least one detection of a length of time, during which the exchange of messages in the discussion has stopped, exceeding a (predefined) threshold.

Thus, the chatbot can restart the discussion if it runs out of steam, or at least revitalize it if the exchange of messages between users begins to slow down by a duration corresponding to the aforementioned threshold.

In addition or as a variant, the predetermined rules may include at least one detection of a mood of at least one of the participants and a taking into account of said mood in sending or not sending a message responding to a message from that participant.

Indeed, it is necessary to overcome the problem of a chatbot response not being appropriate to the discussion context. For example, a chatbot intended for a single conversational partner may react as if the set of conversational partners is composed of only one person. The chatbot can thus have a reaction that would be appropriate for one of the conversational partners, but inappropriate for the others (demonstrating a lack of empathy, failing to take into account the knowledge or language of one of the parties, etc.). The chatbot's taking into account the mood of the participants separately for each participant, thus makes it possible to overcome this problem.

In such an embodiment, in the event of the chatbot sending the response message, the response message sent is then adapted to said mood of said at least one of the participants.

In an embodiment where the exchanged messages are spoken (in a voice messaging context for example), detection of the mood of said at least one of the participants is enhanced by detecting voice components in the voice message of said at least one of the participants.

For example, an increase in tonal frequency and/or sound level in a participant's speech signals characterizes that the participant is irritated.

In an implementation which makes use of participant mood detection, it is further possible to:

analyze each message from a participant before publication for the other participants in the discussion, in order to detect a mood of said participant on the basis of the message to be published, and in the event that a mood is detected that reflects a predefined emotion (typically a negative emotion such as anger for example) with a score exceeding a threshold, correcting the message before publication so as to reduce said score, and publishing the corrected message to the participants in the discussion.

Such an implementation makes it possible to improve, for example, relationships between work colleagues in the particular case of applying the method to implementing a chatbot in a collaborative professional context, as described in detail below.

In one further embodiment, the method may comprise, in order to formulate a message to be sent:

accessing a knowledge database, identifying a subject in the database linked to at least one latest message in the discussion, and forming an informative message to be sent, comprising data from the knowledge base.

Thus, the chatbot contributes here to providing informative content to all the participants and can thus enrich their general knowledge or their professional knowledge.

For example, in the case of a discussion planned in a professional, collaborative work setting, the aforementioned knowledge database may include information specific to a professional sector of this collaborative work setting.

The messages sent by the chatbot can then include professional tasks assigned to at least some of the participants in the discussion, the method then comprising in this embodiment a consultation of the knowledge base in order to organize a sequential coordination of the assigned professional tasks, based on an identification of the participants in the discussion.

In this application, the chatbot not only participates in the exchange of messages with the participants in the discussion, but also proposes an assignment of tasks, possibly with organizational assistance provided to each of the participants.

According to another aspect, a computer program is proposed comprising instructions for implementing the method as defined herein when this program is executed by a processor. According to another aspect, a computer-readable non-transitory storage medium is provided on which such a program is stored.

According to another aspect, a computing device is proposed (reference DIS in FIG. 1 discussed in detail below) comprising an interface for communicating with an instant messaging server (SER) and a processing circuit configured for accessing a memory storing predetermined rules (RP) of a chatbot in order to implement a method according to the present document.

According to another aspect, a chatbot server (DIS) is proposed which processes communication data between a plurality of terminals (TER) running an instant messaging application in which users participating in a discussion exchange messages via respective terminals (TER), the chatbot server comprising:

a message generator capable of analyzing the exchanged messages in order to identify a current discussion context, determining a relevance of the chatbot intervening in the discussion on the basis of the current context and on the basis of predetermined rules, providing a message appropriate to the current context and to at least one of the participants, and an interface for communicating with an instant messaging server (SER) capable of sending the at least one appropriate message to the at least one of the participants.

BRIEF DESCRIPTION OF THE DRAWINGS

Other features, details, and advantages will become apparent upon reading the detailed description below, and upon analyzing the attached drawings, in which.

DETAILED DESCRIPTION OF CERTAIN ILLUSTRATIVE EMBODIMENTS

In the description below, the intervention of a virtual agent (or chatbot) is proposed, here in a collective discussion specifically, thus allowing several users to interact with a digital environment. This chatbot relies on a knowledge base in order to propose responses appropriate to a context detected by applying predetermined rules. Depending on the contexts detected, it may offer to guide operations involving several users in a work context, with sequencing of the tasks to be carried out, or, as in the simple example implementations presented for educational purposes below, to share general knowledge with several users by contributing appropriately to a conversation.

The chatbot is capable of distinguishing between the various participants and adapting the message to each one, or to the entire group at once, or even to certain people specifically. Thus, the predetermined rules make it possible to manage the interaction in the sense of an individualized user experience in a collective discussion. Individualization of the chatbot's messages is based in particular on individualization criteria such as accreditation, age (child/adult), competence in the technicality of the subject under discussion, an emotional state, a cultural reference, etc., of the participant(s) receiving the chatbot's message.

Figure 1:
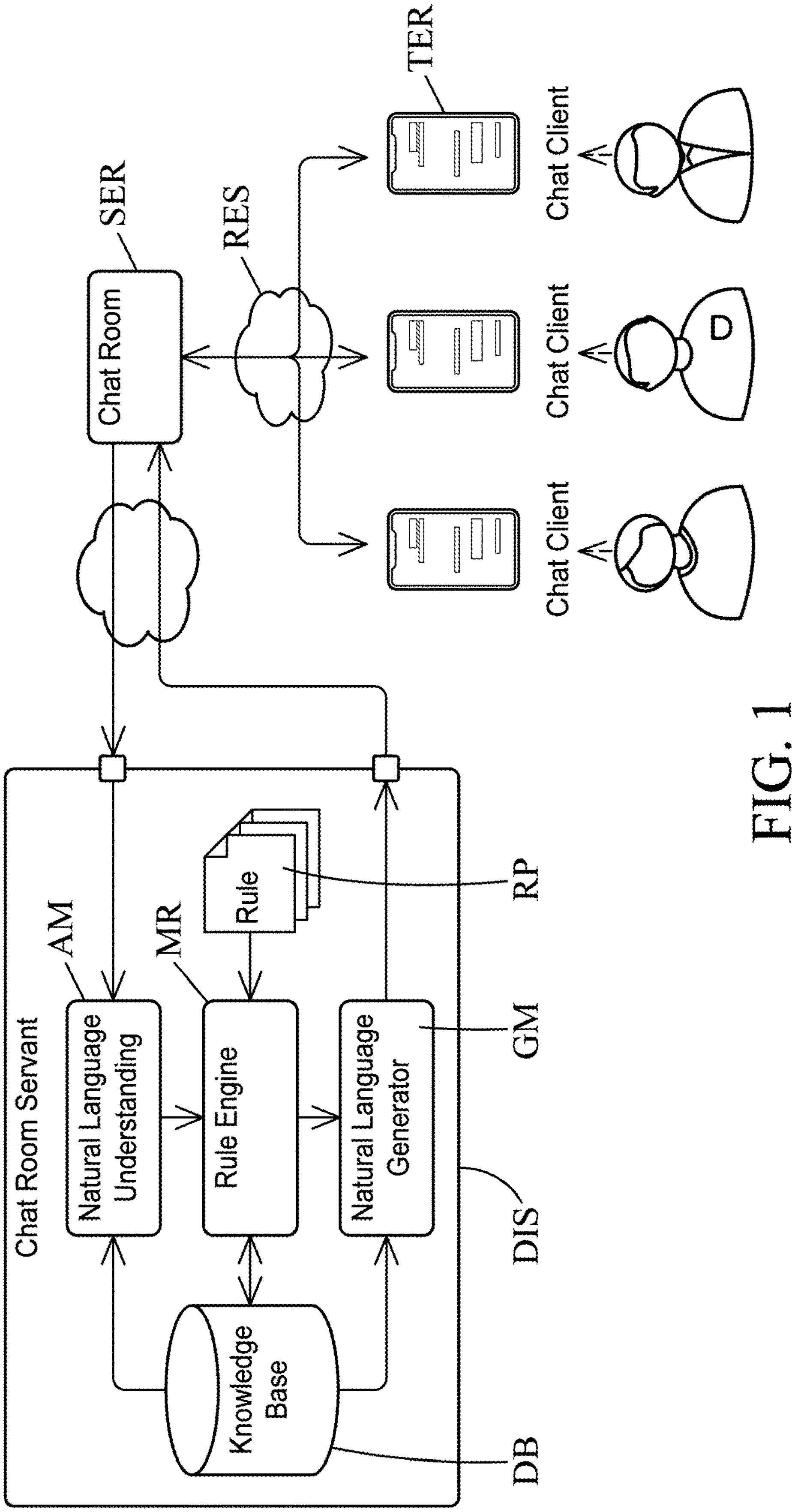
FIG. 1 shows an example of a system with a chat room type of messaging server, user terminals, and a computing device according to one embodiment.

Reference is now made to FIG. 1 in which each user has a terminal TER running a "Chat Client" computer application which allows sending and receiving messages spoken and/or written in natural language via a wide-area network RES (Internet type) and intended for an instant messaging server SER (designated by the term "Chat Room" in FIG. 1) which then routes messages, in natural language, from a "Chat Client" of a user to the "Chat Clients" of other users. The messages may in fact be spoken by users and their content identified by voice recognition, and/or be written directly by users.

In addition, these messages are also routed (here by chat room server SER) to a device DIS, also called chatbot server within the meaning of this disclosure, which in the described example can take the form of a second server designated by the term "Chat Room Servant". Device DIS makes use of a chatbot application and can thus access a memory storing a database DB identifying the "knowledge" on which the chatbot can rely in order to provide informational messages appropriate to a conversation context between the Chat Client users. Device DIS can also access a memory storing predetermined rules RP (for example in the form of computer instruction code) defining the contexts of possible interventions of the chatbot (when to intervene during a conversation), as well as the appropriate ways for the chatbot to intervene (how to intervene during the conversation, for example depending on the mood of each participant).

Thus, to respond to a request for information for example, the Chat Room Servant can return a statement from its knowledge base BD. To this end, it implements:

- an application AM for analyzing messages in natural language (or "Natural Language Understanding"), enabling the chatbot to interpret the messages exchanged between the various participants during the discussion,
- an application GM for generating messages in natural language (or "Natural Language Generator"), enabling the chatbot to intervene in the conversation,
- a rule engine application MR (or "Rule Engine"), enabling the chatbot to rely on the aforementioned predetermined rules to detect a conversation context and form a response appropriate to this context.

In particular, natural language message generator GM may include message analyzer AM and/or rule engine MR, making it possible to create messages according to predetermined rules.

In one particular embodiment, the chatbot server (DIS) processes communication data between a plurality of terminals (TER) running an instant messaging application in which users participating in a discussion exchange messages via respective terminals (TER), the chatbot server comprising:

- a message generator capable of analyzing the exchanged messages in order to identify a current discussion context, determining a relevance of the chatbot intervening in the discussion on the basis of the current context and on the basis of predetermined rules, providing a message appropriate to the current context and to at least one of the participants, and
- an interface for communicating with an instant messaging server (SER) capable of sending the at least one appropriate message to the at least one of the participants.

The rules of the rule engine can be modified by a user such as an authorized administrator, or by learning related to typical discussion situations. Thus, the "Chat Room Servant" application, by taking into account a specific set of rules, can adopt a particular overall behavior such as "dominant", "expressive", "analytical", "friendly", or others.

In addition, new rules can be determined which enrich the rule engine, prior to the sending of a message by the second server-chatbot DIS, including during an ongoing discussion using a chatbot.

Targeted communication can also be implemented towards only one or only some of a group of participants in a discussion. Therefore, the Chat Room Servant may not provide the same information to all participants. A concept of roles may further be provided, such as the distribution of communication "for information", or "for action", depending on the profiles.

Presented below as an example is a table of possible message exchanges in natural language in which the chatbot intervenes:

TABLE 1

| SENDER: | PARTICIPANT A | PARTICIPANT B | CHAT ROOM SERVANT | COMMENTS |
|---|---|---|---|---|
| Message M1 | I visited the Eiffel Tower. Beautiful monument! | | | |
| Message M2 | | Was that the first time? | | |
| Message M3 | Yes. I wonder how old it is? | | | |
| Message M4 | | . . . | The Eiffel Tower was built in 1887 | Detection of a question not answered by one of the participants after a predefined duration: intervention of the chatbot |
| Message M5 | I hope that it will continue to be part of French heritage and that it will not be sold one day! | | | |
| Message M6 | | | Victor Lustig already sold it in 1925! | Spontaneous contribution from the chatbot, here with a touch of humor. The response given to message M4 seems relevant and participant A seems interested and waiting for a comment, possibly humorous, about message M5. |
| Message M7 | | Very funny! **Butler**, can you please remind me who Victor Lustig was? | | "Butler" is the name given to the chatbot in this example. |
| Message M8 | | | Victor Lustig was a notorious conman who even managed to scam Al Capone. | The chatbot answers the question directly addressed to it. |

In particular, second server-chatbot DIS is able to intervene in the discussion on the basis of predetermined rules and/or by using a dynamic object-oriented language, such as "Smalltalk". Second server-chatbot DIS is thus able to identify the moments when it should intervene in particular based on criteria linked to one or more participants, in particular individualization criteria, including for example emotional criteria. These individualization criteria are not necessarily predefined but can depend on the context, the individuals, etc.

Figure 2:
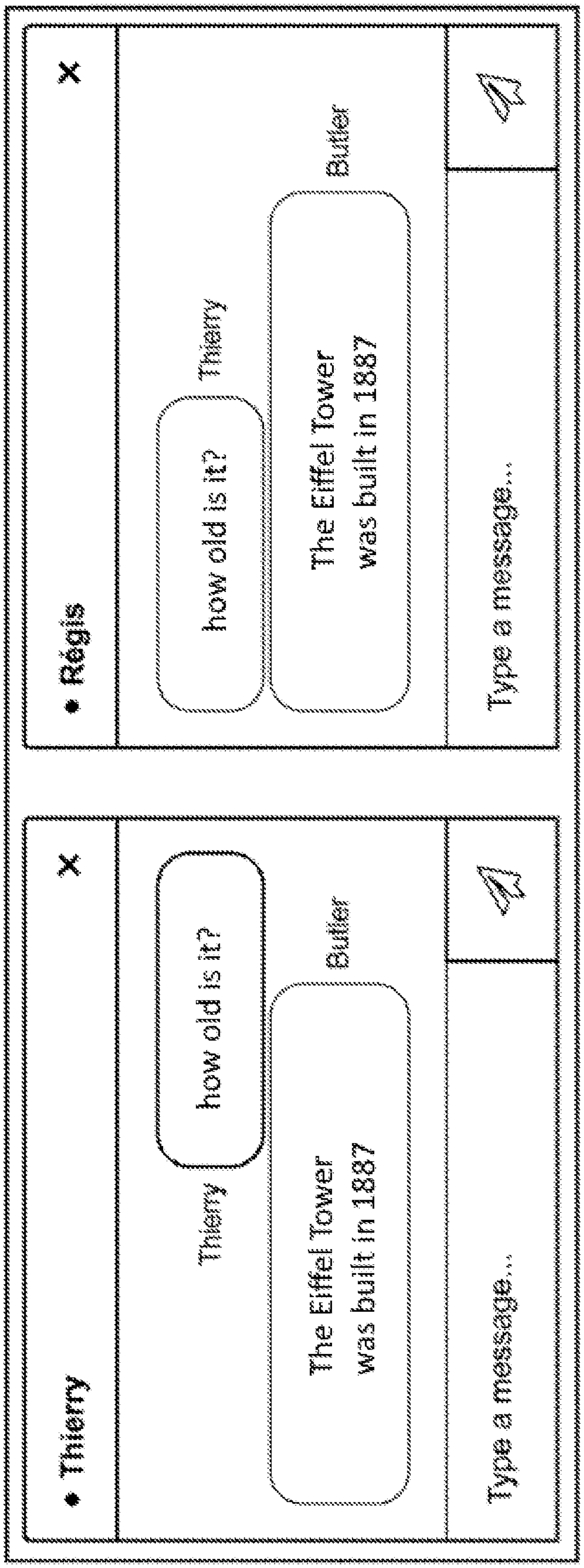
FIG. 2 shows an example of an exchange of messages involving a chatbot within the meaning of this description.

Note in message M7 and its response M8 that the intervention of the chatbot in the exchanges can be triggered for example by a given name of the chatbot, such as "Butler". As illustrated in FIG. 2, the chatbot can be given a name, including in the exchanges with "bubbles" mentioning the names of the speakers in the conversation (here Thierry for participant A and Régis for participant B, and therefore Butler for the chatbot).

More generally, if the participants do not want the chatbot to speak unexpectedly, it is possible to define an exchange "protocol" in which all messages sent to the chatbot begin with a keyword (for example its name "Butler" or a wake-up word).

Figure 3:
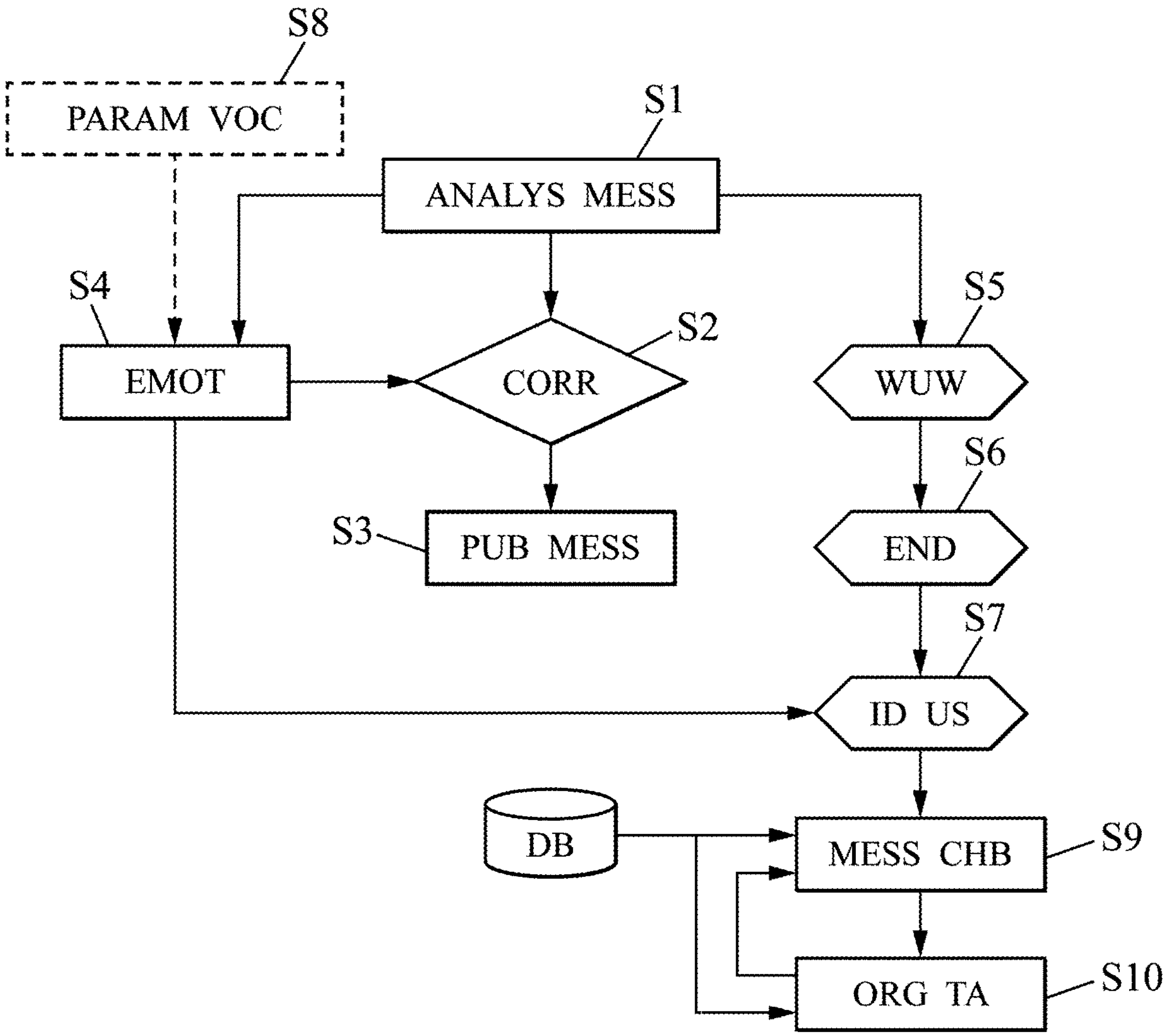
FIG. 3 shows, by way of example, the steps of a method according to one embodiment.

Referring now to FIG. 3, after analyzing the messages from human users in step S1 (via natural language analysis processing techniques using artificial intelligence for example) to detect certain remarks (those that are not entirely accurate, violent, inciting hatred, or others), the chatbot can "correct" the messages as a moderator, in step S2, before finally sending out each message to the set of participants in step S3. Messages can thus be analyzed by the chatbot before being published to participants, particularly in a work setting. The chatbot can evaluate, for example, an emotion score in step S4 that each message may arouse and, if the score exceeds a predefined threshold, can correct such a message to make it more impersonal before publishing it in step S3.

Furthermore, for the intervention of the chatbot in the exchanges, the chatbot can detect for example a wake-up word (step S5) or parameters indicating the end of a statement from one or more participants (step S6), or others, in order to initiate a response message in step S9. For example in step S6, the chatbot's analyzer can identify the end of a discussion paragraph from an conversational partner, or the end of an exchange between two people, or the end of a conversation, allowing it to intervene at an opportune moment without interrupting an ongoing discussion.

Optionally, the chatbot may distinguish between the various conversational partners and their profiles in order to take this into account in its intervention in step S7. The chatbot may limit its intervention typically on the basis of the mood of the conversational partner it is addressing, for example. The distinction between the various participants is made in particular according to the expression (emotion in the message) of each participant (after step S4). For example, in the case of repeated use by a given participant of certain words or specific constructions which interrupt sentences, the chatbot may intervene less in response to this user's comments. Thus, the chatbot can distinguish between the various participants (in relation to their email account for example, or the like) and limit or on the contrary increase the number of its interventions with one participant or another on the basis of parameters detected in the messages and reflecting the respective moods of these participants.

In the case of a voice chat room application (the messages exchanged being audio messages), the chatbot, in addition to receiving the messages spoken by the people in the chat room, can measure the periods of silence, in particular after a question. Subsequently, when silence follows a question, the Chat Room Servant can trigger a previously programmed reaction in order to restart the conversation, or make a joke or some other comment. For example, in a communication similar to a conference call, if a moderator says: "Is there anything anyone wants to say to wrap up?", after ten seconds of silence the Chat Room Servant can take the floor to say "Do you want me to sing you a song?".

In this type of implementation of a voice chat room, the Chat Room Servant also has the capacity to enhance mood detection for one or more participants by measuring in particular a degree of "annoyance" of such participants, on the basis for example of the sound volume and/or the voice frequency of spoken statements (an increasing volume and/or a more acute voice frequency typically characterizing annoyance), these voice parameters being detected in step S8 (illustrated by dotted lines in the voice chat room embodiment). Depending on the mood of the participants, the Chat Room Servant can then react by implementing a previously programmed behavior (playing soft music, a statement reminding of the rules of conduct, diplomatic words, etc.) in step S9. For example, mood detection is carried out on the basis of acoustic signals and/or other signals (image, physiological, semantic, etc.)

In terms of possible applications, in a work context for example, the Chat Room Servant has the capacity to orchestrate interventions by different people based on information from its knowledge base DB, in order to organize, in step S10, a distribution of roles and instructions to participants in the chat room according to their profiles, and to collect their feedback in order to monitor progress in collaborative tasks.

The advantage of the second server-chatbot according to the development is its adaptability to users, to usage, and to context (time, location, environment, etc.)

More generally, the Chat Room Servant can be used in a home setting (with voice assistants), or in a business setting (teleconferencing with the Chat Room Servant as a mediating chatbot), or in a factory. In an industrial context, it is thus possible to steer an intervention, store written information precisely and automatically, by implementing for example a programmed memory to generate and store a fault tree and possibly enrich a resolution tree by learning. The Chat Room Servant can be initiated by an application inviting the people concerned (managers and workers) by an event, or alternatively at the specific request of a person (a worker facing a problem) by inviting the Chat Room Servant and other people (other workers and managers) to participate in a spontaneous chat room, in order to understand an event and make thoughtful decisions collectively. In another example application, for example outside a strict work framework, a motorist who has broken down can initiate a chat room with the Chat Room Servant, a mechanic, and himself in order to determine if he is able to repair the vehicle alone or to arrange for the intervention of a repairman.

The invention claimed is:

1. A method of processing communication data between a plurality of terminals running an instant messaging application in which users participating in a discussion exchange messages via respective terminals, the method, implemented by a computerized chatbot, comprising:

analyzing the exchange of messages in order to identify a current discussion context, determining a relevance of the chatbot intervening in the discussion, on the basis of the current context and on the basis of predetermined rules, and on the basis of the determination, sending, to at least one of the participants, at least one message appropriate to the current context and to at least one of the participants, wherein the at least one appropriated message includes an assignation of a task to at least one of the participants based on the exchange, the chatbot acting thereby as an active task assigner, the method comprising, in order to formulate the at least one appropriated message to be sent:

accessing a knowledge database, identifying a subject in the database linked to at least one last message in the discussion, and forming the at least one appropriated message, comprising data from the knowledge base of a task to assign.

2. The method according to claim 1, wherein the predetermined rules include at least the detection of a wake-up word for the chatbot in a latest message of the discussion.

3. The method according to claim 1, wherein the predetermined rules include at least one detection of a length of time, during which the exchange of messages in the discussion has stopped, exceeding a threshold.

4. The method according to claim 1, wherein the predetermined rules include at least one detection of a mood of at least one of the participants and a taking into account of the mood in sending or not sending a message responding to a message from the at least one of the participants.

5. The method according to claim 4, wherein, in the event a response message is sent, the response message sent is adapted to the mood of the at least one of the participants.

6. The method according to claim 4, wherein the exchanged messages are spoken, and detection of the mood of the at least one of the participants is enhanced by detecting voice components in the voice message of the at least one of the participants.

7. The method according to claim 4, further comprising:

analyzing each message from a participant before publication for the other participants in the discussion, in order to detect a mood of the participant on the basis of the message to be published, in the event that a mood is detected that reflects a predefined emotion with a score exceeding a threshold, correcting the message before publication so as to reduce the score, and publishing the corrected message to the participants in the discussion.

8. The method according to claim 1, wherein the discussion is planned within a professional, collaborative work framework, and the knowledge database includes information specific to a professional sector of the collaborative work framework.

9. The method according to claim 8, wherein the messages sent by the chatbot include professional tasks assigned to at least some of the participants in the discussion, the method comprising a consultation of the knowledge base in order to organize a sequential coordination of the assigned professional tasks, based on an identification of the participants in the discussion.

10. A computer-readable non-transitory storage medium on which a computer program is stored for implementing the method according to claim 1 when the computer program is executed by a processor.

11. A computing device comprising an interface for communicating with an instant messaging server and a processing circuit configured for accessing a memory storing predetermined rules of a chatbot in order to implement the method according to claim 1.

12. A chatbot server processing communication data between a plurality of terminals running an instant messaging application in which users participating in a discussion exchange messages via respective terminals, the chatbot server comprising:

a message generator capable of analyzing the exchange of messages in order to identify a current discussion context, determining a relevance of the chatbot intervening in the discussion on the basis of the current context and on the basis of predetermined rules, providing a message appropriate to the current context and to at least one of the participants, wherein the message includes an assignation of a task to at least one of the participants based on the exchange, the task being determined on the basis of a query to a knowledge base, the chatbot acting thereby as an active task assigner; and an interface for communicating with an instant messaging server capable of sending the at least one appropriate message to the at least one of the participants.

13. The method according to claim 1, wherein the assignation of the task is further based on profiles of the participants.

* * * * *